May 23, 1933. W. R. WILLIAMS 1,910,455
TOY
Filed Oct. 28, 1932
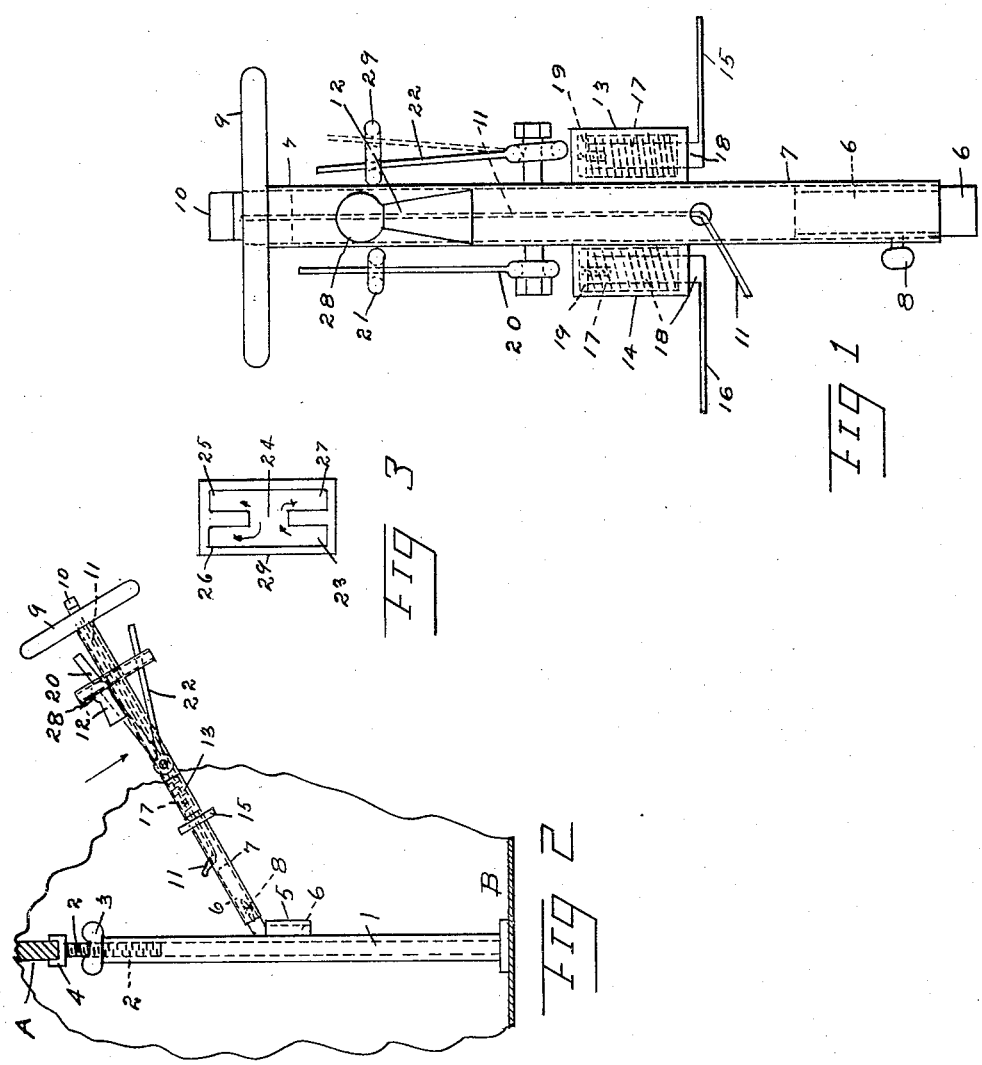

Patented May 23, 1933

1,910,455

UNITED STATES PATENT OFFICE

WILLIAM R. WILLIAMS, OF SALT LAKE CITY, UTAH

TOY

Application filed October 28, 1932. Serial No. 640,047.

This invention relates to a dummy toy attachment for automobiles, and has for one of its objects to provide a dummy steering toy that can be attached to an automobile in such a manner that when a child is sitting in the seat thereof it can operate the dummy steering wheel and go through with all the movements of driving an automobile.

Another object of this invention is to provide a dummy steering attachment for automobiles, having a clutch lever, a brake lever, a gear shift lever, an emergency brake lever, a horn, and a steering wheel.

It must be understood that this toy is in no way to be connected with the steering mechanism of the automobile, it is only an attachment that can be removed at the will of the operator.

With these and other objects in view the invention consists of the following arrangements of parts to be hereinafter described and claimed.

In the accompanying drawing forming a part of this specification and in which corresponding parts are denoted by like reference characters, is illustrated the preferred embodiment of the invention, capable of carrying the same into practical operation, it being understood that the invention is not necessarily limited thereto, as various changes in shape, proportions and general assemblage of its parts may be resorted to without departing from the principles of the invention or sacrificing any of its advantages, and the right is therefore reserved for making all changes and modifications that will fall within the scope of the invention and claims made therefor.

Referring to the drawing:

Figure 1 is an enlarged view of the invention looking at it in the direction of the arrow Fig. 2.

Figure 2 is a fragmentary section of the dash board and floor of an automobile showing the invention secured thereto.

Figure 3 is an enlarged face view of bracket 29.

The reference character A denotes the lower edge of the instrument board and B the floor of an automobile between which the invention is secured.

The invention comprises an anchor rod 1 the lower end thereof resting on the floor B, the upper end having a rod 2 placed therein. The rod 2 has threads thereon onto which is placed a thumb nut 3. On the upper end of the rod 2 is placed a jaw or channel 4 which fits under the edge of the dash or instrument board A. The thumb nut when turned on the rod 2 forces the channel 4 against the under edge of the dash board to hold the support 1 in place between the dash board and floor. On the side of the support 1 is a pocket 1 into which is placed one end of a rod 6. The other end of the rod 6 is placed within a tubing 7 and secured therein by a thumb screw 8. The tubing is adjustable on the rod 6.

On the upper end of the tubing 7 is placed a hand wheel 9 which is rotatably secured thereto. In the center of the hand wheel 9 is placed a push button 10 which is connected to a wire 11 that passes down through the tubing and out of the tubing through an aperture therein. The wire 11 may be attached to the main horn of the automobile if so desired. Or it may be attached to an electric toy horn used in place of the horn 12. The horn 12 is secured to the tubing 7 and is operated by the child pressing on the bulb 28 to sound the horn. Secured to the tubing 7 are brackets 13 and 14 into which the arm 18 of the foot pedals 15 and 16 are placed. A spring 17 is placed over each arm 18 and is held thereon by a screw 19. The foot pedal 15 denotes the clutch lever and the foot pedal 16 denotes the brake lever of an automobile. The child operates these pedals to suit himself.

Pivotally secured to the tubing 7 is a lever 20 that is held into place by a guide 21 which has a slot therein in which the lever is moved back and forth when the child wishes to set the emergency brake which this lever 20 represents.

Pivotally and laterally placed on a bolt secured to the tubing 7 is another lever 22 which represents the gear shifting lever of an automobile. The lever 22 is secured into place by a bracket 29 secured to the tubing 7. The operation of this lever is shown by arrows in Fig. 3. Starting at point 23 the lever is moved through opening 24 and to point 25 thence back through opening 24 to point 26 thence back through opening 24 to point 27 and then back through point 24 to starting point 23.

Having thus described the invention what I claim as new and desire to secure by Letters Patent is:

1. A toy attachment for automobiles comprising an anchor rod, means for securing said anchor rod to an automobile, said anchor rod having a pocket thereon in which is placed one end of a rod, a tubing placed over the other end of said rod, means for adjusting said tubing to said rod, brackets on said tubing, pedals operating from said brackets, one of said pedals to represent the clutch lever and the other of said pedals to represent the brake lever of an automobile, levers pivotally secured to said tubing, one of said levers to represent the emergency brake and the other of said levers to represent the gear shift on an automobile. A steering wheel on the upper end of said tubing having a push button thereon, a wire connecting said push button, said wire to be attached to an electric circuit of an automobile, and a horn secured to said tubing all substantially as set forth.

2. A toy attachment for automobiles comprising an anchor rod, means for securing said anchor rod to an automobile, said anchor rod having a pocket thereon in which is placed one end of a rod, a tubing placed over the other end of said rod, means for securing said tubing to said rod, said tubing having pockets thereon, a pedal secured within each of said brackets, one of said pedals represents the clutch and the other of said pedals represents the brake lever of an automobile, levers pivotally attached to said tubing, one of said levers represents the emergency brake and the other of said levers represents the gear shift lever of an automobile, a wheel rotatably placed on the upper end of said tubing, said wheel having a push button thereon which is connected by a wire to a horn if desired and a horn secured to said tubing all substantially as set forth.

WILLIAM R. WILLIAMS.